US009665725B2

United States Patent
Curtis

(10) Patent No.: US 9,665,725 B2
(45) Date of Patent: May 30, 2017

(54) GESTURE BASED ACCESS CONTROL METHOD AND SYSTEM

(71) Applicant: Microchip Technology Incorporated, Chandler, AZ (US)

(72) Inventor: Keith E. Curtis, Gilbert, AZ (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 83 days.

(21) Appl. No.: 14/616,076

(22) Filed: Feb. 6, 2015

(65) Prior Publication Data

US 2016/0232364 A1 Aug. 11, 2016

(51) Int. Cl.
*G06F 21/00* (2013.01)
*G06F 21/60* (2013.01)
*G06F 21/45* (2013.01)
*G06F 3/046* (2006.01)
*G06F 3/01* (2006.01)
*G06F 21/71* (2013.01)
*G06K 9/00* (2006.01)

(52) U.S. Cl.
CPC ............ *G06F 21/604* (2013.01); *G06F 3/017* (2013.01); *G06F 3/046* (2013.01); *G06F 21/45* (2013.01); *G06F 21/71* (2013.01); *G06K 9/00335* (2013.01); *G06F 2203/04101* (2013.01)

(58) Field of Classification Search
CPC .......... G06F 21/30; G06F 21/31; G06F 21/32; G06F 21/36; G06F 21/45
See application file for complete search history.

(56) References Cited

U.S. PATENT DOCUMENTS

| 2007/0075968 | A1* | 4/2007 | Hall | G06F 3/046 345/157 |
| 2012/0249450 | A1* | 10/2012 | Haff | G06F 21/36 345/173 |
| 2012/0313882 | A1* | 12/2012 | Aubauer | G06F 3/046 345/174 |
| 2012/0328350 | A1* | 12/2012 | Taverner | G07F 7/10 400/714 |

(Continued)

OTHER PUBLICATIONS

"MGC3130: Single-Zone 3D Gesture Controller Data Sheet," Microchip Technology Incorporated, URL: http://ww1.microchip.com/downloads/en/DeviceDoc/41667a.pdf, 40 pages, Dec. 11, 2012.

(Continued)

*Primary Examiner* — Edward Zee
(74) *Attorney, Agent, or Firm* — Slayden Grubert Beard PLLC

(57) ABSTRACT

Gesturing is used to enter a unique combination of hand positions and/or movements for accessing a secured device having a security entry system requiring that a correct code be entered before allowing access thereto. An authorized user places his/her hand(s) over a gesture sensing structure and executes a series of movement/gestures to unlock and gain access to the secured device. The gesture sensing structure may be placed inside of a visual shield so that visually intercepting the coded positions/movements may be prevented. Left and right gestures may be used to allow using traditional tumbler lock combinations to unlock and gain access to the secured device. A combination of gestures may be used to create a plurality of security combinations.

20 Claims, 6 Drawing Sheets

(56) References Cited

U.S. PATENT DOCUMENTS

2014/0198059 A1   7/2014  Gu et al. .................... 345/173
2014/0267155 A1   9/2014  Aubauer et al. ............. 345/174
2015/0022490 A1   1/2015  Heim .......................... 345/174

OTHER PUBLICATIONS

International Search Report and Written Opinion, Application No. PCT/US2016/015290, 13 pages, Apr. 28, 2016.

"MGC3130: Single-Zone 3D Tracking and Gesture Controller Product Brief," Microchip Technology Incorporated, 6 pages, Dec. 5, 2013.

"MGC3030/3130: GestIC® Technology Quick Start Guide," Microchip Technology Incorporated, 5 pages, Jan. 15, 2015.

* cited by examiner

GESTURE BASED ACCESS CONTROL METHOD AND SYSTEM

TECHNICAL FIELD

The present disclosure relates to access control, in particular, using non-contact gesturing for access to a secured environment.

BACKGROUND

Access may be restricted in many ways. Generally some type of mechanical or electronic lock may be used to restrict access to only those having the appropriate mechanical key, lock combination, personnel identification number (PIN), and the like. Mechanical locks, accessible by a key and/or rotating wheel combination, have been used for years and predate electronic locking means. Computers, cash dispensing kiosks, electronic access panels, etc., may use unique combinations of numbers and/or letters that must be entered by an individual wanting to access what the unique combination is protecting.

However, all of these access restriction devices suffer from the ability of unauthorized persons to be able to defeat the keys, combinations and/or codes that are supposed to make these restricted access devices secure. For example, a keypad access system may be compromised by dusting the keyboard with a fine invisible powder only visible with a special light or chemical. Then once the numbers are known, it is a simple matter to try all potential combinations thereof. Also the keypad may be observed with a camera and/or binoculars and the numbers recorded that are pushed when an authorized user is inputting the correct codes. Putting the keypad in a less obvious place may make it difficult for the user to see the keypad and/or compromise the user's situation awareness in an area prone to muggers.

Mechanical combination locks use noisy tumbler mechanisms that allow an unauthorized person to listen to the tumbler mechanism and thereby determine the lock combination. Key based access control mechanisms suffer from the ability of an unauthorized person to "pick" the lock or make use of a "bump" key to defeat the lock. Hand and eye scanners may be used as security devices but suffer from being expensive and mechanically complicated. May be compromised by removal of the user's eyeball or severance of a hand. An authorized user may leave physical evidence of a hand print.

SUMMARY

Therefore a need exists for a more secure and private way of access to a secured environment that is less prone to being breached by an unauthorized person.

According to an embodiment, a method for access control using gesturing may comprise the steps of: providing a structure comprising at least one transmitting electrode and a plurality of receiving electrodes; generating an alternating electric field from the at least one transmitting electrode; modifying the alternating electric field by placing an object in the electric field; measuring the alternating electric field at each one of the plurality of receiving electrodes; comparing the measured alternating electric field at each one of the plurality of receiving electrodes with predefined electric field values of a gesturing library in a memory of a digital signal processor (DSP); determining a plurality of gestures from the comparison of the measured alternating electric field at each one of the plurality of receiving electrodes with the predefined electric field values; comparing the determined plurality of gestures with an expected plurality of gestures, wherein if the determined plurality of gestures may be substantially the same as the expected plurality of gestures then issue an access acceptance command, and if not do nothing.

According to further embodiment of the method, disabling the step of comparing the measured alternating electric field when an unidentified object may be in close proximity to at least one of the plurality of receiving electrodes. According to further embodiment of the method, the plurality of gestures may be selected from the group consisting of any two or more of the following: position up, position down, position right, position left, position in, position out, motion clockwise, motion counter-clockwise, motion up, motion down, motion right, motion left, motion in, and motion out. According to further embodiment of the method, the plurality of gestures may comprise at least one gesture motion and at least one gesture position. According to further embodiment of the method, the plurality of gestures may comprise a plurality of gesture motions. According to further embodiment of the method, the plurality of gestures may comprise a plurality of gesture positions.

According to another embodiment, a system for access control using gesturing may comprise: a structure comprising an electrical insulator, at least one transmitting electrode and a plurality of receiving electrodes; a gesture sensing controller having at least one transmitting output coupled to the at least one transmitting electrode for generating an alternating electric field, and a plurality of receive inputs coupled to respective ones of the plurality of receiving electrodes for receiving the alternating electric field; wherein the gesture sensing controller measures received alternating electric fields at each of the plurality of receiving electrodes; the gesture sensing controller determines a plurality of gestures from the received electric fields; and protected access equipment for comparing the plurality of gestures determined by the gesture sensing controller with an expected plurality of gestures, wherein if the determined plurality of gestures may be substantially the same as the expected plurality of gestures then issue an access acceptance command, and if not do nothing.

According to further embodiment, the structure may be substantially flat, and the at least one transmitting electrode and the plurality of receiving electrodes may be on opposite faces of the substantially flat structure. According to further embodiment, the structure may be substantially flat, and the at least one transmitting electrode and the plurality of receiving electrodes may be embedded in opposite faces of the substantially flat structure. According to further embodiment, the structure may have a defined length, width and height. According to further embodiment, the structure may be a painting. According to further embodiment, the structure may be a picture. According to further embodiment, the structure may be a statue. According to further embodiment, the structure may be a lamp.

According to further embodiment, the gesture sensing controller may comprise: an analog front end (AFE) comprising the at least one transmitting output and the plurality of receive inputs; a digital signal processor couple to the AFE for receiving values of the received electric fields to determine alternating electric field measurements thereof; a memory comprising a gesturing library and coupled to the digital signal processor, wherein the digital signal processor uses the gesturing library in determining the plurality of gestures; and a communications interface coupled between the digital signal processor and the protected access equipment.

According to further embodiment, a cover over the structure may be provided for blocking visions of the plurality of gestures during executions thereof. According to further embodiment, an enclosure may be provided for containing the structure and blocking visions of the plurality of gestures during executions thereof. According to further embodiment, the plurality of receiving electrodes may be five receiving electrodes. According to further embodiment, the at least one transmitting electrode may be one transmitting electrode.

BRIEF DESCRIPTION OF THE DRAWINGS

A more complete understanding of the present disclosure may be acquired by referring to the following description taken in conjunction with the accompanying drawings wherein.

Figure 1:
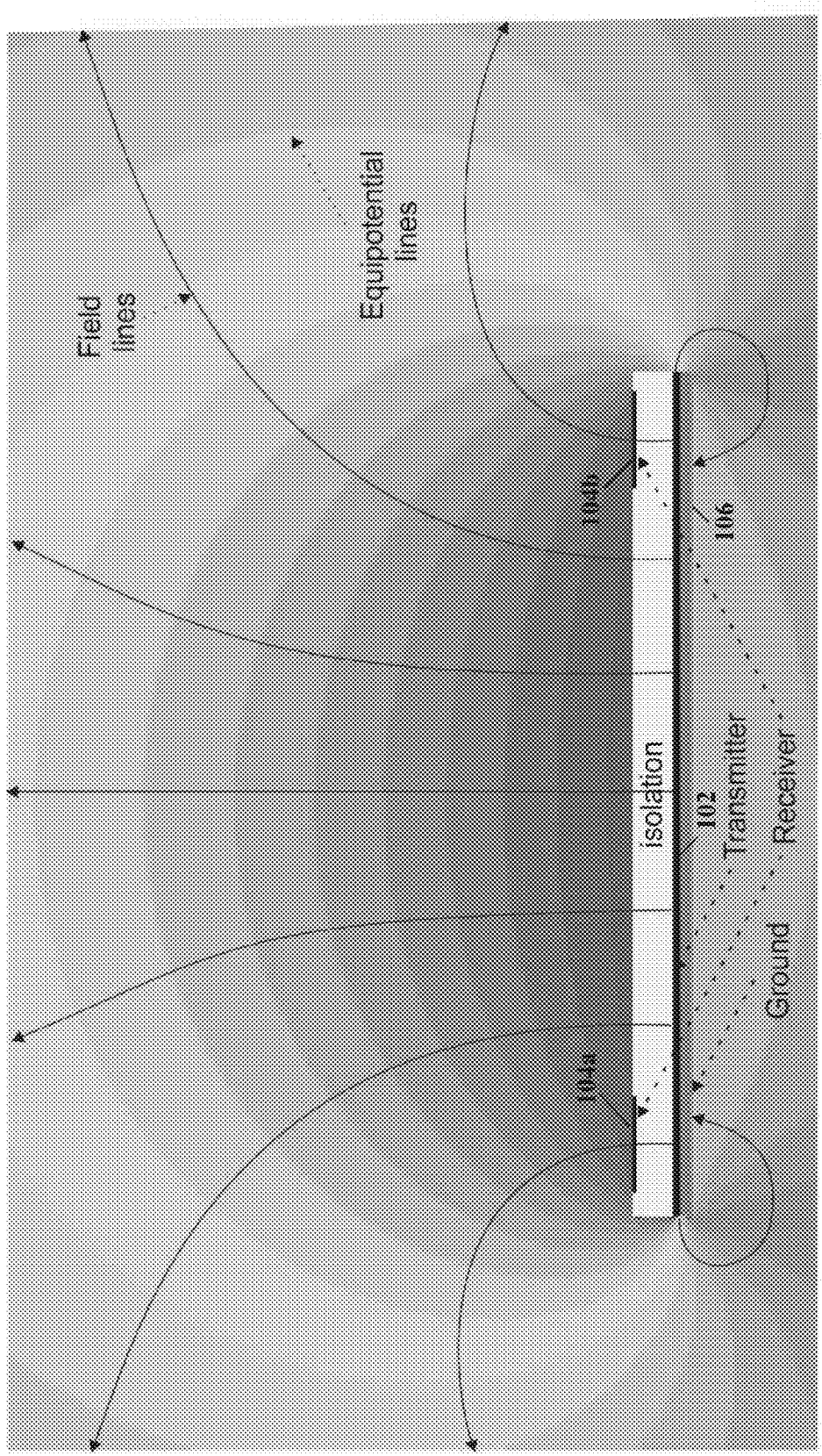
FIG. 1 illustrates a schematic graph of equipotential lines of an undistorted E-field, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to the teachings of this disclosure, gesturing may be used to enter a unique combination of positions and/or movements of a portion of an authorized user's body, e.g., hand, to enter the correct combination of positions/movements for access without coming into contact with a monitoring entry point. For example, an authorized user may place his/her hand(s) over a position/movement detector(s) and execute a series of movement/gestures to unlock the protection mechanism, e.g., door lock, money kiosk, vault door, vehicle door, computer program, etc. These gestures may be a combination of relative hand movements, so absolute positioning of the hand(s) may not be necessary, just the correct combination of relative motions. This feature eliminates the need for visual feedback, although it may be used to assist the unlocking/access operation.

Because the authorized user need not touch the entry point mechanism, no physical evidence of the security combination is left behind. The lack of moving parts in the entry point mechanism prevents a listening attachment from discovering the access code. A visual shield may be placed over the entry point mechanism so that visually intercepting the coded positions/movements may be prevented. E.g., an enclosure containing the position/movement detector(s) in which a hand may be inserted and shielded from view before performing the necessary gesturing positions/movements. Clockwise and counter-clockwise rotation motion gestures may be used to allow simulation of traditional tumbler lock combinations to unlock the protection mechanism. A sequence of up, down, right, left, in, and/or out motions may similarly be used to unlock the protection mechanism. Since there is no key used, a pick or bump attack is not feasible, and the presence of a foreign object may prevent access if such object(s) are in close proximity to the protection mechanism.

To do this secure access gesturing, according to the teachings of this disclosure, a three-dimensional (3D) sensor technology utilizes an electric field (E-field) for sensing location(s) and movement(s) of an object in the E-field. This 3D sensor technology enables new user interface applications by detection, tracking and classification of, for example but not limited to, a user's hand or finger motion in free space. E-fields are generated by electrical charges and propagate three-dimensionally around the surface of an object carrying the electrical charge. Applying direct current (DC) voltages to an electrode results in a constant electric field. Applying alternating current (AC) voltages makes the charges vary over time and thus, the E-field, therefore AC excitation is used. When the charge varies sinusoidal with frequency f, the resulting electromagnetic wave is characterized by wavelength $\lambda=c/f$, where c is the wave propagation velocity—in vacuum, the speed of light. In cases where the wavelength, $\lambda$, is much larger than the electrode geometry, the magnetic component is practically zero and no wave propagation takes place. The result is a quasi-static electrical near field that can be used for sensing conductive objects in the E-field such as parts of the human body, e.g., finger(s), hand, etc.

A radio frequency transmitter may generate frequencies in the range of from about 44 to about 115 kilohertz (kHz). For example, but is not limited to, about 100 kHz which has a wavelength of about three kilometers. With electrode geometries of typically less than fourteen by fourteen centimeters, this wavelength is much larger in comparison. In case a person's hand or finger intrudes the electrical field, the field becomes distorted. The field lines are drawn to the hand due to the conductivity of the human body itself and shunted to ground. The three dimensional electric field decreases locally. A plurality of receiver (Rx) electrodes may be used to detect the E-field variations at different positions by measuring the origin(s) (three dimensional locations) of the electric field distortion(s) from the varying signals received. This information may be used to calculate the position, track movements and classify object movement patterns (gestures).

Referring now to the drawings, the details of specific example embodiments are schematically illustrated. Like elements in the drawings will be represented by like numbers, and similar elements will be represented by like numbers with a different lower case letter suffix.

Figure 2:
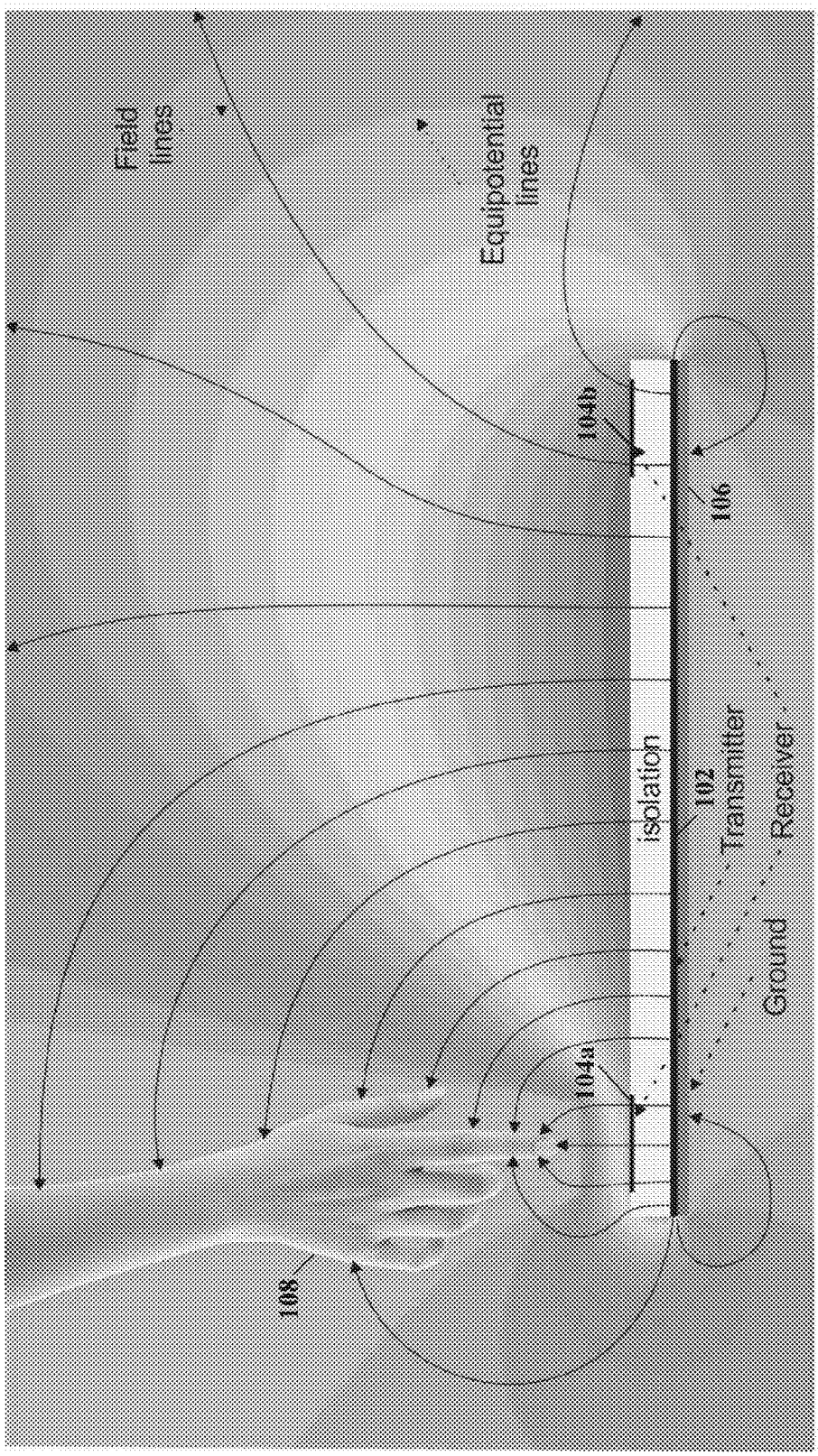
FIG. 2 illustrates a schematic graph of equipotential lines of a distorted E-field, according to the teachings of this disclosure.

Referring to FIGS. 1 and 2, depicted is a schematic graph of equipotential lines of an undistorted E-field (FIG. 1) and a distorted E-field (FIG. 2), according to the teachings of this disclosure. The highest field strength is in the plates between the transmitting electrode 102 and the receiving electrodes 104 but a significant part of the E-field may also be contained in the stray E-field. The transmitting electrode 102 and the receiving electrodes 104 may be located proximate to and in parallel with a ground plane 106. FIG. 2 show the influence of an earth-grounded part of a body (hand and finger) 108 to the E-field. The proximity of the hand and finger 108 causes a compression (deformation) of the equipotential lines and shifts the receive electrode signal levels to a lower potential that can be measured and quantified.

According to the teachings of this disclosure relevant background documents for Microchip Technology Incorporated gesturing technology (GestIC®) are, for example but are not limited to, "MGC3130 GestIC® Technology Quick Start Guide," "GestIC® Design Guide: Electrodes and System Design MGC3130," and all other MGC3130 documents referenced therein as more fully explained at www.microchip.com in the related product data sheets and application notes for the MGC3130 device manufactured by Microchip Technology Incorporated, wherein all are hereby incorporated by reference herein for all purposes. GestIC® is a registered trademarks of Microchip Technology Incorporated, Corporation Delaware, Legal Department, 2355 West Chandler Boulevard, Chandler, Ariz. 85224-6199.

Figure 3:
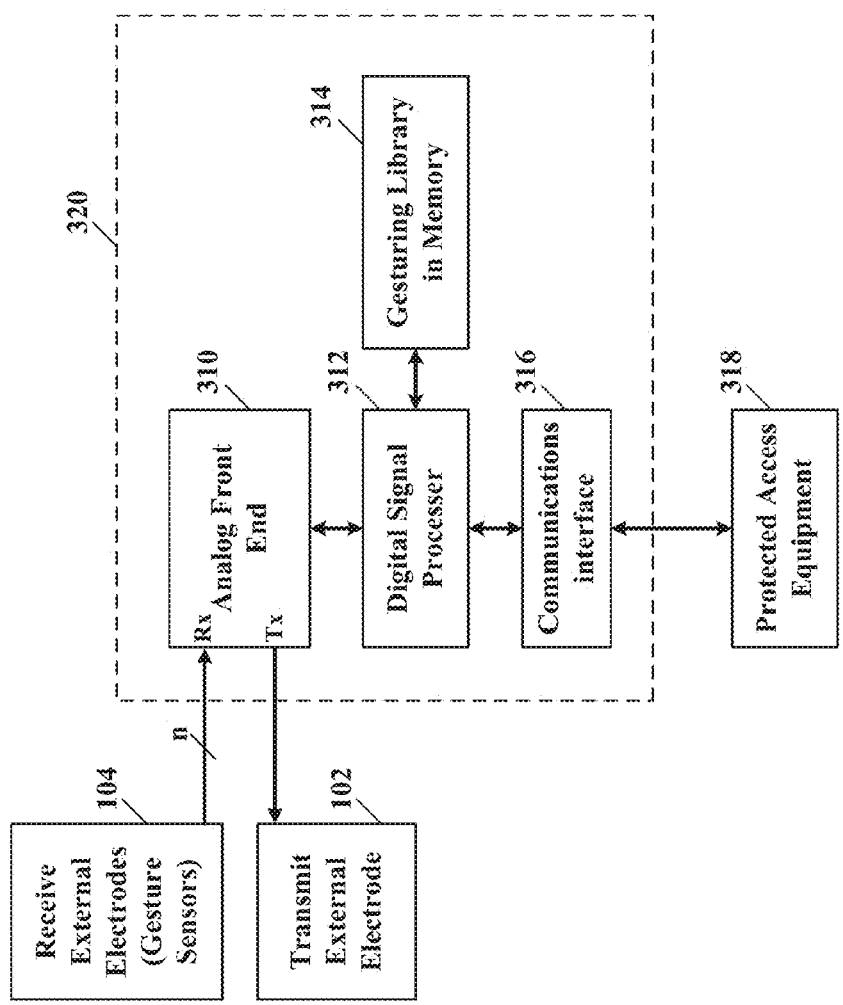
FIG. 3 illustrates a schematic block diagram of a gesture sensing controller connected to gesture sensing electrodes and protected access equipment, according to specific example embodiments of this disclosure.

Referring to FIG. 3, depicted is a schematic block diagram of a gesture sensing controller connected to gesture sensing electrodes and protected access equipment, according to specific example embodiments of this disclosure. An electrical-field (E-field) based three dimensional (3D) tracking and gesture sensing controller 320 may comprise an analog front end (AFE) 310, a digital signal processor (DSP) or digital signal controller (DSC) 312, a memory 314 containing an operating program and a gesturing library, and a communications interface 316. The communications interface 316 may interface the gesture sensing controller to protected access equipment 318. The AFE 310 may be coupled to at least one transmitting electrode 102 and a plurality of receiving electrodes 104 (gesture sensors). The AFE 310 may comprise very sensitive receive channels that are capable of detecting distortions of the transmitted electrical field corresponding to capacitive changes in the Femtofarad (1 fF=$10^{15}$ farad) range. In order to transmit and receive an electrical field, the electrodes 102 and 104 have to be connected to the transmitting and receiving channels, respectively, of the AFE 310. The arrangement of the electrodes 104 allows determining a center of gravity of the electric field (E-field) distortion and, thereby, tracking of the cause of this distortion, e.g., a user's hand or finger in the E-field detection space. An E-field based 3D tracking and gesture sensing controller 312 may be, for example is but not limited to, a MGC3130 3D gesture sensing controller made by the assignee of this application, Microchip Technology Incorporated.

Figure 4:
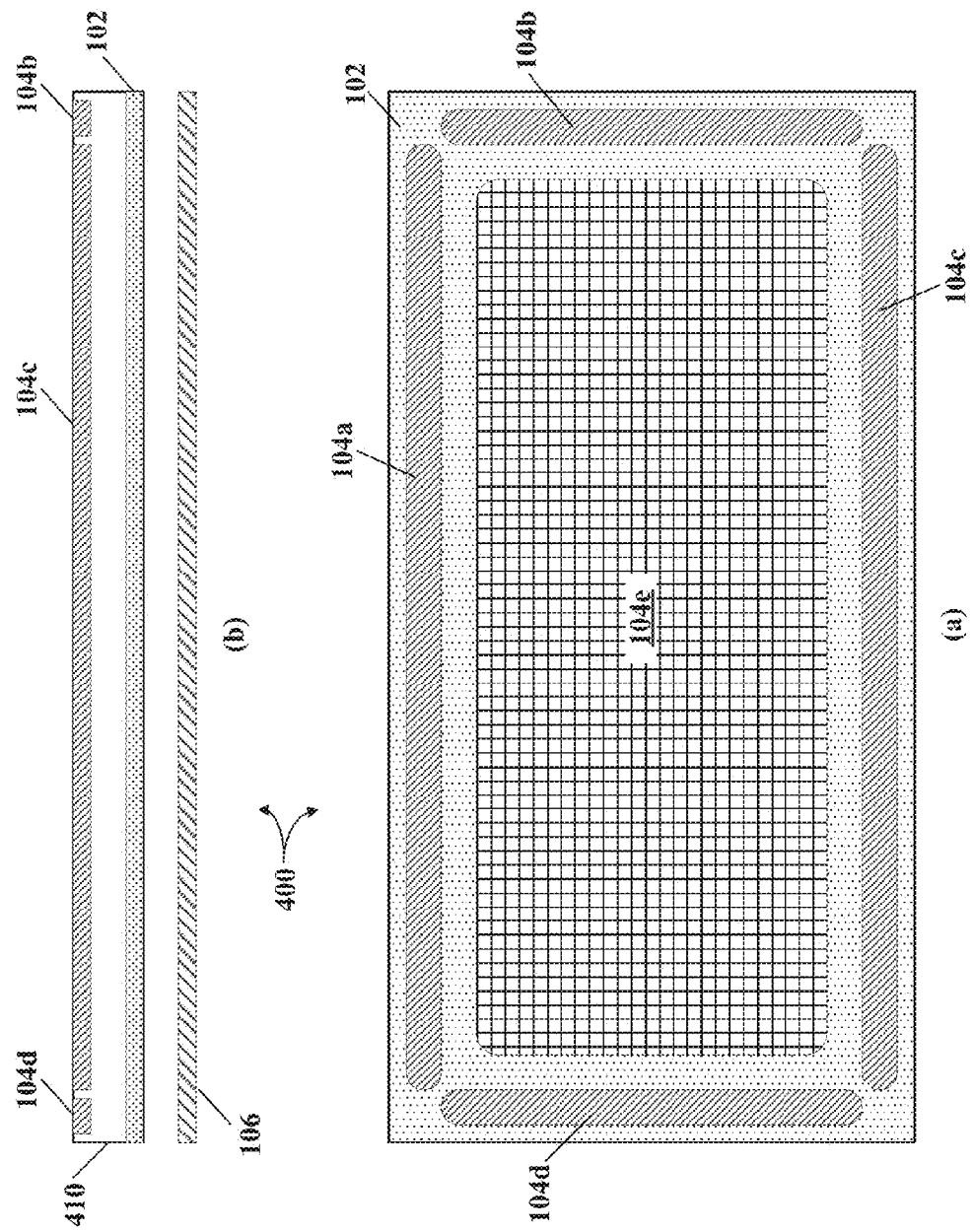
FIG. 4 illustrates schematic plan and elevation diagrams of a gesture sensing panel having frame shaped electrodes, according to a specific example embodiment of this disclosure.

Referring to FIG. 4, depicted are schematic plan and elevation diagrams of a gesture sensing panel having frame shaped electrodes, according to a specific example embodiment of this disclosure. A gesture sensing panel, generally represented by the numeral 400, may comprise at least one transmitting electrode 102, a plurality of receiving electrodes (gesture sensors) 104, electrically isolating insulation 410 between the at least one transmitting electrode 102 and the plurality of receiving electrodes (gesture sensors) 104, and a ground plane 106. The gesture sensing panel 400 may be coupled to the gesture sensing controller 320 which may cause an E-field around the gesture sensing panel 400, as shown in FIG. 1, and when an object is inserted into the E-Field the E-field distortions may be represented as shown in FIG. 2.

Figure 5:
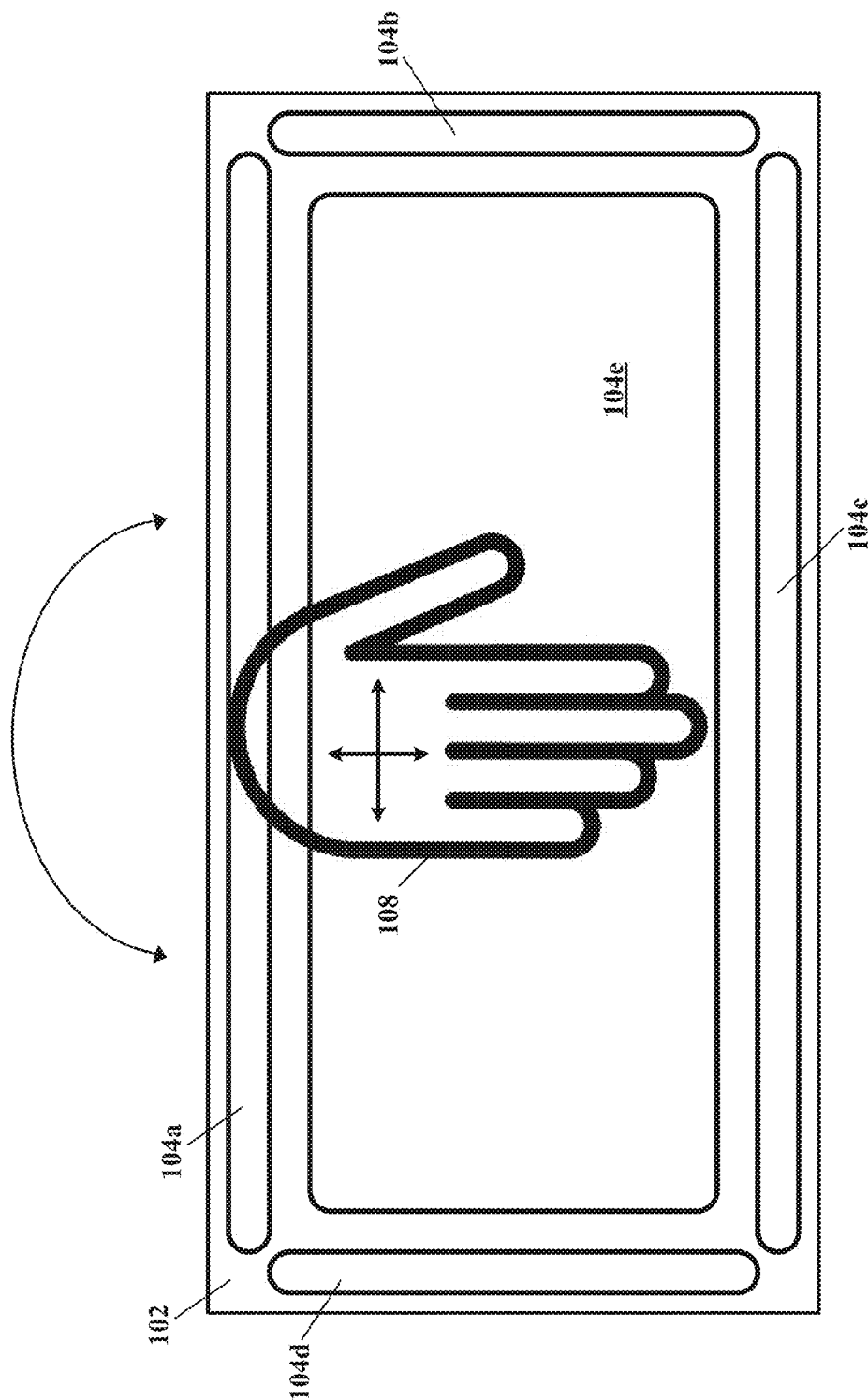
FIG. 5 illustrates a schematic plan diagram of the gesture sensing panel shown in FIG. 4 and possible hand gesturing motions, according to the teachings of this disclosure.

Referring to FIG. 5, depicted is a schematic plan diagram of the gesture sensing panel shown in FIG. 4 and possible hand gesturing motions, according to the teachings of this disclosure. The AFE 310 receives the E-field signals from the plurality of receiving electrodes (gesture sensors) 104 and the DSP 312 processes these E-field signals to determine the various gesture inputs. Therefore different motions of a hand 108 may be detected and recognized, e.g., right, left, up, down, in (closer in), out (farther away), clockwise and counterclockwise rotation of the hand 108. By using any one or more of these hand motions in a certain order a sequential combination thereof may be used to access (unlock) a secure system. No physical contact with the gesture sensing panel 400 is required or desired; therefore no physical evidence is left by a user. A combination of gestures may be used to create a plurality of security combinations. It is contemplated and within the scope of this disclosure that gestures of the hand 108 may simulate a two or three dimensional "air" mouse for use with a computer, and/or that the gesture sensing panel 400 may be integral with the computer display. Thereby allowing 3D gesture inputs in addition to the more traditional two dimensional touch screen operation.

Figure 6:
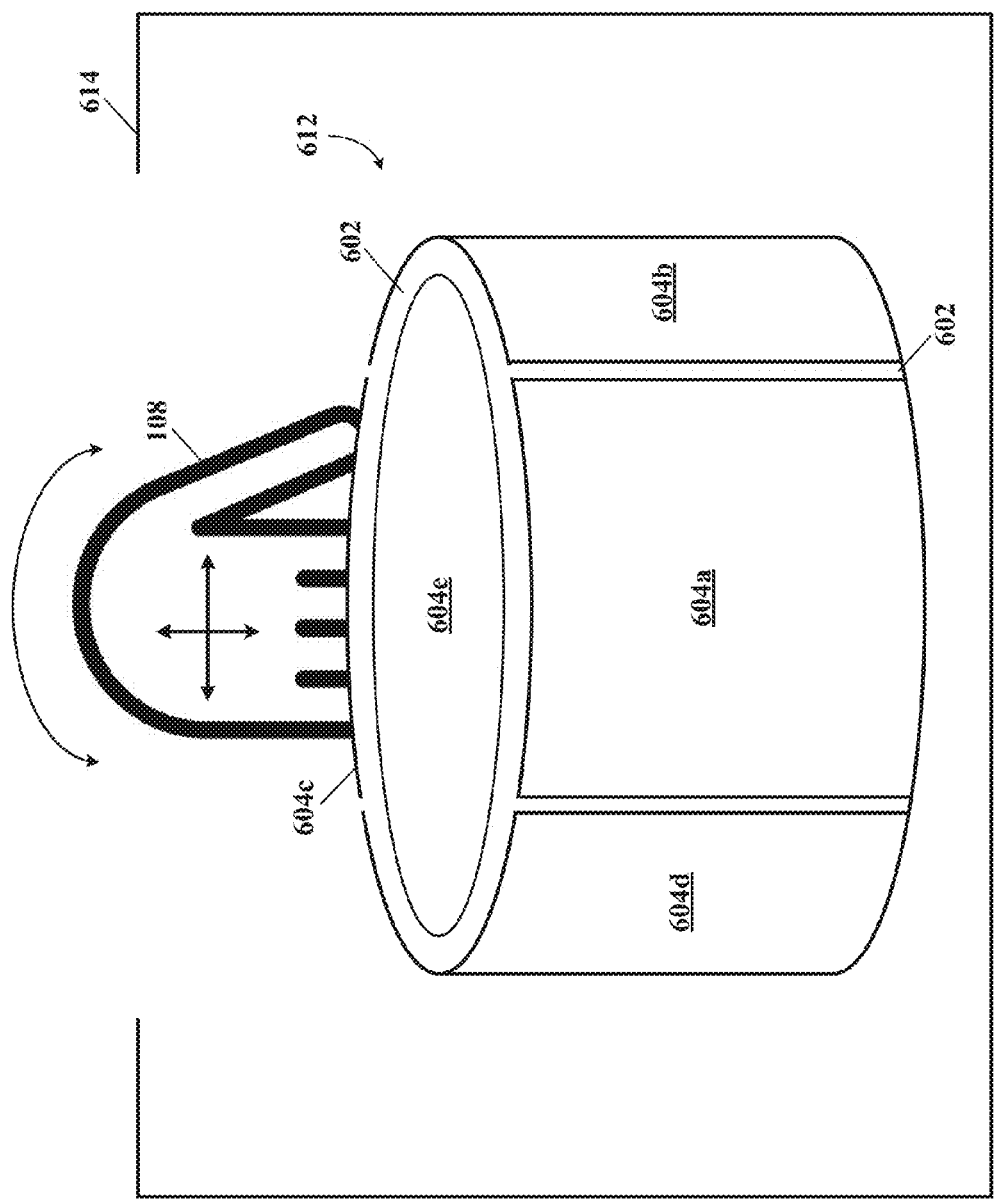
FIG. 6 illustrates a schematic diagram of a gesture sensing structure having circular shaped electrodes and located inside of a visual shield, according to another specific example embodiment of this disclosure.

Referring to FIG. 6, depicted is a schematic diagram of a gesture sensing structure having circular shaped electrodes and located inside of a visual shield, according to another specific example embodiment of this disclosure. A gesture sensing structure, generally represented by the numeral 612, may comprise at least one transmitting electrode 602, a plurality of receiving electrodes (gesture sensors) 604, with electrically isolating insulation (not shown) between the at least one transmitting electrode 602 and the plurality of receiving electrodes (gesture sensors) 604. The gesture sensing structure 612 may be coupled to the gesture sensing controller 320 which may cause an E-field around the gesture sensing structure 612, as shown in FIG. 1, and when an object is inserted into the E-Field, the E-field distortions may be represented as shown in FIG. 2. Furthermore, the gesture sensing structure 612 may be enclosed inside of a cover or chamber 614 that blocks any visibility to the gesture motions required to perform the coded unlocking function by the hand 108. The cover or chamber 614 effectively prevents observation, e.g., binoculars, camera, etc., of the gesture motions of the hand 108 during the accessing (unlocking) procedure.

The gesture sensing structure 612 is not limited in shape or size and may comprise any three dimensionally shaped object so long as there are electrodes thereon and/or therein for generating and receiving an electric field(s). This three dimensional object may even be disguised as a piece of artwork, e.g., statue, painting, picture, poster etc.; an appliance, e.g., lamp, toaster, can opener, makeup mirror, radio, television, stereo, game box and remote controller thereof, etc.

The plurality of receiving electrodes (gesture sensors) 604 and the at least one transmitting electrode 602 may be behind or embedded in wood, gorilla glass, plastic, etc. No eye-hand coordination is required so the gesture sensing structure 612, and optionally, cover or chamber 614, may be mounted at, for example but not limited to, waist level, thereby out of sight from prying eyes. Additional metrics may be used to increase the security of the gesturing combination, e.g., timing of motion changes. The security combination may be changed remotely. Any gesturing activity can be monitored remotely and attempts of unauthorized access dealt with accordingly.

Therefore different motions of a hand 108 over and/or around the gesture sensing structure 612 may be detected and recognized, e.g., right, left, up, down, in (closer), out (farther away), clockwise and counterclockwise rotation of the hand 108. By using any one or more of these hand motions in a certain order a sequential combination thereof may be used to access (unlock) a secure system.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for access control using gesturing, said method comprising the steps of:
   providing a structure comprising at least one transmitting electrode and a plurality of receiving electrodes;
   generating an alternating electric field from the at least one transmitting electrode;
   modifying the alternating electric field by placing an object in the electric field;
   measuring the alternating electric field at each one of the plurality of receiving electrodes;
   comparing the measured alternating electric field at each one of the plurality of receiving electrodes with predefined electric field values of a gesturing library in a memory of a digital signal processor (DSP);
   determining a plurality of gestures from the comparison of the measured alternating electric field at each one of the plurality of receiving electrodes with the predefined electric field values;
   comparing the determined plurality of gestures with an expected plurality of gestures, wherein if the determined plurality of gestures are substantially the same as the expected plurality of gestures then issue an access acceptance command, and if not do nothing; and
   disabling the step of comparing the measured alternating electric field when an unidentified object is in close proximity to at least one of the plurality of receiving electrodes, the close proximity including a distance less than a defined threshold.

2. The method according to claim 1, wherein the plurality of gestures are selected from the group consisting of any two or more of the following: position up, position down, position right, position left, position in, position out, motion clockwise, motion counter-clockwise, motion up, motion down, motion right, motion left, motion in, and motion out.

3. The method according to claim 1, wherein the plurality of gestures comprise at least one gesture motion and at least one gesture position.

4. The method according to claim 1, wherein the plurality of gestures comprise a plurality of gesture motions.

5. The method according to claim 1, wherein the plurality of gestures comprise a plurality of gesture positions.

6. The method of claim 1, wherein disabling the step of comparing the measured alternating electric field when an unidentified object is in close proximity to at least one of the plurality of receiving electrodes further includes disabling the comparison based upon the unidentified object reaching the close proximity while approaching the receiving electrodes.

7. The method of claim 1, wherein disabling the step of comparing the measured alternating electric field when an unidentified object is in close proximity to at least one of the plurality of receiving electrodes further includes disabling the comparison when the unidentified object is below the threshold and enabling the comparison when the unidentified object is above the threshold.

8. A system for access control using gesturing, said system comprising:
   a structure comprising an electrical insulator, at least one transmitting electrode and a plurality of receiving electrodes;
   a gesture sensing circuit having at least one transmitting output coupled to the at least one transmitting electrode for generating an alternating electric field, and a plurality of receive inputs coupled to respective ones of the plurality of receiving electrodes for receiving the alternating electric field;
   wherein the gesture sensing circuit is configured to:
      measure received alternating electric fields at each of the plurality of receiving electrodes; determine a plurality of gestures from the received electric fields; and
   a protected access circuit configured to:
      compare the plurality of gestures determined by the gesture sensing circuit with an expected plurality of gestures, wherein if the determined plurality of gestures are substantially the same as the expected plurality of gestures then issue an access acceptance command, and if not do nothing; and
      disable comparing the measured alternating electric field when an unidentified object is in close proximity to at least one of the plurality of receiving electrodes, the close proximity including a distance less than a defined threshold.

9. The system according to claim 8, wherein the structure is substantially flat, and the at least one transmitting electrode and the plurality of receiving electrodes are on opposite faces of the substantially flat structure.

10. The system according to claim 8, wherein the structure is substantially flat, and the at least one transmitting electrode and the plurality of receiving electrodes are embedded in opposite faces of the substantially flat structure.

11. The system according to claim 8, wherein the structure has a defined length, width and height.

12. The system according to claim 10, wherein the structure is a painting.

13. The system according to claim 10, wherein the structure is a picture.

14. The system according to claim 11, wherein the structure is a statue.

15. The system according to claim 11, wherein the structure is a lamp.

16. The system according to claim 8, wherein the gesture sensing circuit comprises:
   an analog front end (AFE) comprising the at least one transmitting output and the plurality of receive inputs;
   a digital signal processor couple to the AFE for receiving values of the received electric fields to determine alternating electric field measurements thereof;
   a memory comprising a gesturing library and coupled to the digital signal processor, wherein the digital signal processor uses the gesturing library in determining the plurality of gestures; and a communications interface coupled between the digital signal processor and the protected access circuit.

17. The system according to claim 8, further comprising a cover over the structure for blocking visions of the plurality of gestures during executions thereof.

18. The system according to claim 8, further comprising an enclosure containing the structure and blocking visions of the plurality of gestures during executions thereof.

19. The system according to claim 8, wherein the plurality of receiving electrodes are five receiving electrodes.

20. The system according to claim 8, wherein the at least one transmitting electrode is one transmitting electrode.

* * * * *